(12) United States Patent
Thompson

(10) Patent No.: US 6,976,655 B2
(45) Date of Patent: Dec. 20, 2005

(54) MOUNTING ARRANGEMENT

(75) Inventor: Ewan F Thompson, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/692,680

(22) Filed: Oct. 27, 2003

(65) Prior Publication Data

US 2004/0108413 A1    Jun. 10, 2004

(30) Foreign Application Priority Data

Nov. 6, 2002  (GB) .................................. 0225932

(51) Int. Cl.$^7$ ............................................. B64D 27/00
(52) U.S. Cl. .................. 244/54; 244/12.4; 244/56; 248/554; 248/555
(58) Field of Search .................. 248/554, 555; 244/54, 60, 12.4, 56

(56) References Cited

U.S. PATENT DOCUMENTS

| | | | |
|---|---|---|---|
| 3,848,832 A | * | 11/1974 | Stanley et al. ................. 244/54 |
| 5,088,279 A | | 2/1992 | MacGee |
| 5,277,382 A | | 1/1994 | Seelen |
| 5,746,391 A | * | 5/1998 | Rodgers et al. ................ 244/54 |
| 5,860,275 A | * | 1/1999 | Newton et al. ............ 60/226.1 |
| 6,398,161 B1 | * | 6/2002 | Jule et al. ...................... 244/54 |

FOREIGN PATENT DOCUMENTS

| | | |
|---|---|---|
| GB | 1030521 P | 5/1966 |
| GB | 2360749 A | 10/2001 |
| GB | 2375513 A | 11/2002 |

* cited by examiner

*Primary Examiner*—J. Woodrow Eldred
(74) *Attorney, Agent, or Firm*—W. Warren Taltavull; Manelli Denison & Selter PLLC

(57) ABSTRACT

A mounting arrangement (26) is provided for mounting an engine (10), typically a gas turbine engine, to a vehicle. The mounting arrangement (26) includes connecting means (28, 30) constructed to extend from a core assembly (14) of the engine (10) through an outer component (24) to the vehicle. The mounting arrangement (26) also includes transmission means (41) extending from the connecting means (28, 30) to transmit thrust from the engine (10) to the vehicle.

18 Claims, 1 Drawing Sheet

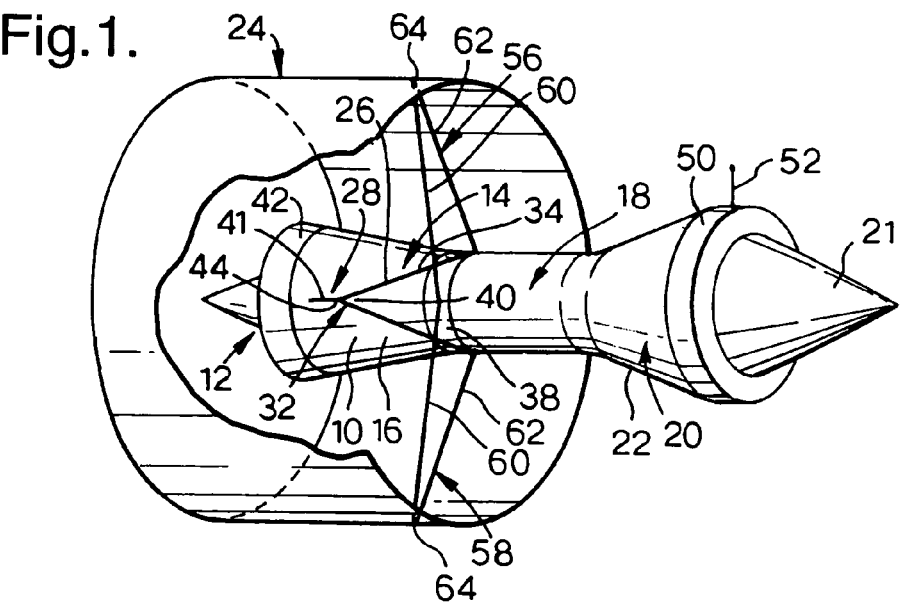
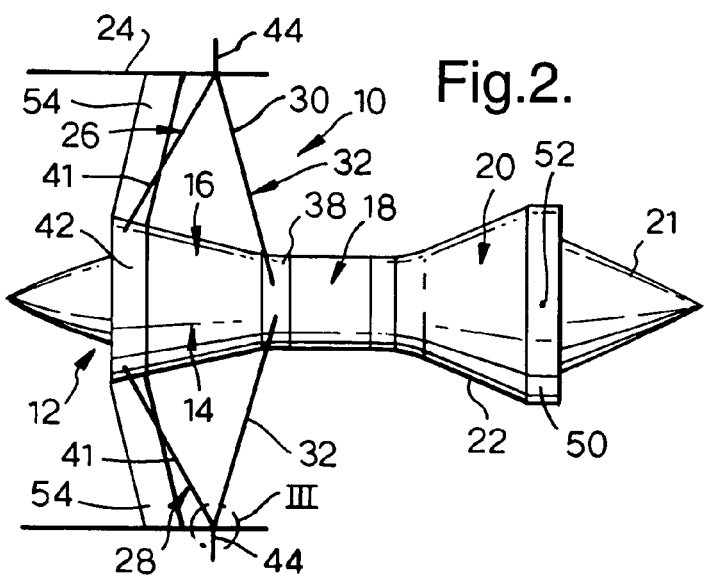
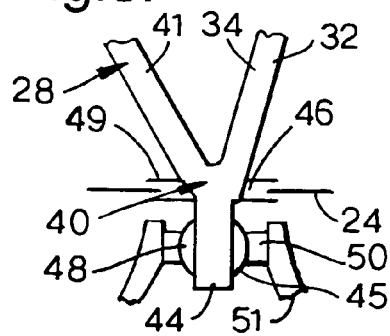
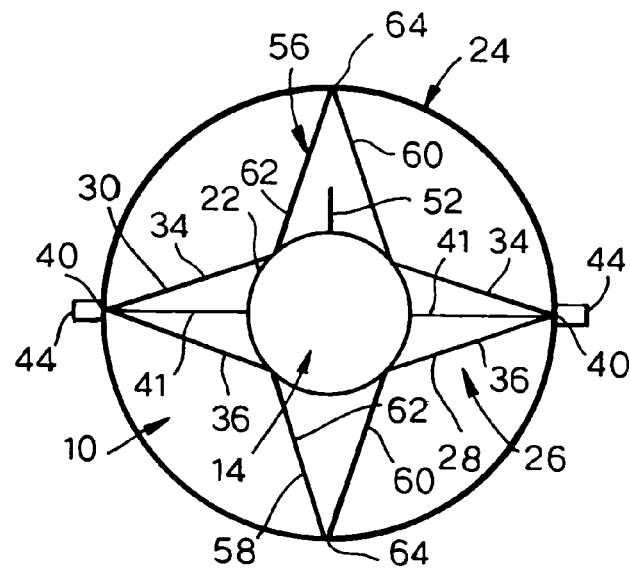

US 6,976,655 B2

MOUNTING ARRANGEMENT

FIELD OF THE INVENTION

This invention relates to mounting arrangements for mounting an engine to a vehicle. More particularly, but not exclusively, the invention relates to mounting arrangements for mounting gas turbine engines to an aircraft.

BACKGROUND OF THE INVENTION

Arrangements for mounting gas turbine engines on aircraft are required to be such that they will minimise stresses and deflections and, such that, in doing so will enable the engine to be as light as possible.

SUMMARY OF THE INVENTION

According to one aspect of this invention, there is provided a mounting arrangement for mounting to a vehicle an engine having a core assembly and an outer component, the mounting arrangement comprising connecting means constructed to extend from the core assembly through the outer component to the vehicle, and the mounting arrangement further comprising transmission means extending from the connecting means to transmit thrust from the engine to the vehicle.

Preferably, the connecting means comprises a strut arrangement and attaching means, the strut arrangement being for connecting the attaching means to the core assembly, and the attaching means being for attaching the strut arrangement to the vehicle.

Preferably, the engine is a gas turbine engine, for example, a three shaft gas turbine engine. The outer component may be a housing surrounding the core assembly, such as a fan case or bypass duct.

The attaching means may comprise a shaft or may comprise pivoting means to provide said pivotal attachment. The pivoting means may comprise a ball joint.

The attaching means may comprise a trunion. The trunion may comprise a trunion pin.

The strut arrangement may comprise a frame comprising a pair of elongate connecting struts joined to each other at one end of each connecting strut to form an apex region. Said apex portion is desirably connected to the attachment means. Conveniently, the opposite end of each elongate connecting strut can be connected to a first region of the engine.

The transmission means may comprise support means to support the connecting means. The support means may comprise an elongate support member having first and second opposite ends. The first end of the elongate support member is preferably connected to the connecting means. Conveniently, the second end of the elongate support member is connected to a second region of the engine. The support means may be connected to the strut arrangement, conveniently in the region of the attaching means. Desirably, the support means is attached at said apex portion.

Preferably, the connecting means comprises an A frame. The mounting arrangement may comprise a tripod arrangement of said elongate members.

The outer component may define an aperture through which the connecting means can extend. In one embodiment, the attaching means may comprise an outwardly extending part of the apex portion which can extend through said aperture. In another embodiment, the attaching means may comprise a head which can be arranged in said aperture.

Sealing means is preferably provided to seal the connection means to the outer component.

Preferably, the mounting arrangement comprises a pair of said connecting means, arrangeable in spaced relationship to each other about the engine. The connecting means may be arranged opposite each other on the engine. Preferably, the pair of connecting means are arranged at substantially diametrically opposed regions of the engine.

The mounting arrangement may further comprise a securing member to further secure the engine to the vehicle. The securing member may be provided rearwardly of the engine and may comprise a link member.

In one embodiment, the mounting arrangement may comprise carrying means to carry the outer component. The carrying means may comprise a pair of legs which may be joined to each other and to the outer component at a vertex region thereof. The carrying means may comprise a further A frame. The carrying means may be arrangeable on the engine at a region between the pair of said connection means, conveniently substantially midway therebetween. The carrying means may comprise two of said further A frames, which may be arranged opposite each other on the engine, conveniently diametrically opposite each other. Preferably, the further A frames are arranged respectively on an upper region and on a lower region of the engine.

According to another aspect of this invention, there is provided a gas turbine engine comprising a core assembly and an outer component, and a mounting arrangement as described above for mounting the engine to a vehicle.

BRIEF DESCRIPTION OF THE DRAWINGS

An embodiment of the invention will now be described by way of example only, with reference to the accompanying drawings, in which:

FIG. 1 is a diagrammatic side view of a gas turbine engine;

FIG. 2 is a part sectional top view of the engine shown in FIG. 1;

FIG. 3 is a view of the region marked III in FIG. 2; and

FIG. 4 is a front schematic view of the engine shown in FIG. 1.

DETAILED DESCRIPTION OF THE INVENTION

Referring to FIG. 1, there is shown a three shaft gas turbine engine 10. The engine 10 comprises a fan 12 and core assembly 14. The fan 12 has a plurality of blades which have been omitted from the drawings for clarity. Downstream of the fan 12 in the core assembly 14 there is provided a compressor arrangement 16 comprising intermediate and high pressure compressors which successively compress the air passing through the core assembly 14.

The core assembly 14 also includes a combustion arrangement 18 and a turbine arrangement 20. The combustion arrangement 18 is provided downstream of the compressor arrangement 16 to combust the compressed air with fuel. The hot combustion products exit the combustion arrangement 18 and expand through the turbine arrangement 20. The turbine arrangement 20 comprises a high pressure turbine, an intermediate pressure turbine and a low pressure turbine. Air passing out of the low pressure turbine is exhausted from the rear of the engine over an exhaust cone 21.

The core assembly 14 also comprises a casing 22 which surrounds the compressor arrangement 16, the combustion arrangement 18 and the turbine arrangement 20. The casing 22 includes an intermediate casing 38 surrounding the central region of the core assembly 14. The intermediate casing 38 is a static part of the engine 10 which, in the embodiment shown, surrounds the compressor arrangement 16 and provides structural support for other parts of the engine 10.

An outer component in the form of a housing 24 for the fan 12 extends around the front region of the core 14 of the engine 10.

In order to mount the engine on an aeroplane, a mounting arrangement 26 is provided which comprises a pair of connecting means 28, 30. Each connecting means 28, 30 comprises strut arrangements in the form of an A frame 32 comprising a pair of elongate struts 34, 36, one end of each of which is mounted on the intermediate casing 38. The two elongate struts 34, 36 are joined together at their opposite ends to form an apex region 40.

At the front of the engine 10, there is provided a front bearing housing 42. Transmission means, in the form of an elongate support member 41, extends from the apex region 40 to the front bearing housing 42 of the engine 10 to form a tripod arrangement.

Attaching means in the form of a shaft or trunion pin 44 extends radially outwardly from the apex region 40 of each connection means 28, 30 through an aperture 46 in the housing 24. The trunion pin 44 extends through a bore 45 in a ball 48. The ball 48 is rotatably held with a race 50, which is attached to the vehicle, a portion of which 51 is shown. Thus, rotation of the pin 44 in the bore 45 and rotation of the ball within the race 50 are permitted. The race 50 is connected directly to a pylon (shown schematically and designated 51) which attaches the engine to the aircraft. Sealing means 49 is provided in the aperture 46 to seal the trunion pin 44 to the housing 24. There is negligible force transmission through the sealing means 49 to the housing 24. The sealing means 49 is provided to prevent leakage of air through the aperture 46.

The two connecting means 28, 30 are arranged diametrically opposite each other on the casing 22 of the core 14 at the horizontal water line of the engine 10.

At the rear of the core assembly 14 of the engine 10, there is provided a tail bearing housing 50. Securing means in the form of a rear mount link 52 is attached to the tail bearing housing 50 to secure the rear of the engine 10 to the pylon for attaching the engine 10 to the aircraft.

The housing 24 is secured to the casing 22 of the core 14 of the engine 10 by fan outlet guide vanes 54 and also by carrying means in the form of a pair of A frames 56, 58. The A frames 56, 58 comprise a pair of elongate legs 60, 62, each having an end attached in spaced relation to each other to the core assembly 14 at the region of the intercase 38. The opposite ends of the legs 60, 62 meet at respective vertex regions 64 which are provided at top dead centre and bottom dead centre of the housing 24.

Thus, there is described a means of attaching a gas turbine engine 10 to an aircraft in which the engine 10 is mounted via the core 14 of the engine 10 through the engine housing 24 so that the engine housing 24 is not part of the connection arrangement.

Various modifications can be made without departing from the scope of the invention.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A mounting arrangement for mounting a gas turbine engine to a vehicle, the engine having a core assembly and a housing, the housing surrounding a fan of the engine, the mounting arrangement comprising connecting means constructed to extend between the core assembly through the housing to the vehicle, wherein the mounting arrangement further comprises transmission means, the transmission means extending from the connecting means to the engine, the transmission means transmiting thrust from the engine to the vehicle wherein the connecting means comprises a strut arrangement and attaching means, the strut arrangement being for connecting the attaching means to the core assembly, and the attaching means being for attaching the strut arrangement to the vehicle wherein the attaching means is selected from one or both of a shaft and pivoting means to provide pivotal attachment.

2. A mounting arrangement according to claim 1, wherein the pivoting means comprises a ball joint.

3. A mounting arrangement according to claim 1, wherein the attaching means comprises a trunion.

4. A mounting arrangement according to claim 1, wherein the connecting means comprises a frame comprising a pair of elongate connecting struts joined to each other at one end of each connecting strut to form an apex portion, the apex portion being connected to the attachment means, and the opposite end of each elongate connecting strut can be connected to a first region of the engine.

5. A mounting arrangement according to claim 1, wherein the transmission means comprises support means to support the connecting means, the support means comprising an elongate support member having first and second opposite ends, the first end of the elongate support member being connected to the connecting means, and the second end of the elongate support member being connected to a second region of the engine.

6. A mounting arrangement according to claim 5, wherein the support means is connected to the strut arrangement in the region of the attaching means.

7. A mounting arrangement according to claim 6, wherein the support means is connected to the connecting means at said apex region.

8. A mounting arrangement according to claim 5, wherein the connecting means comprises an A frame, and the mounting arrangement comprises a tripod arrangement of the elongate struts and the elongate support member.

9. A mounting arrangement according to claim 6, wherein the housing defines an aperture through which the connecting means can extend, and the apex portion of the first and second connecting struts comprises an outwardly extending part which can extend through said aperture.

10. A mounting arrangement according to claim 6, wherein sealing means is provided to seal the connecting means to the housing.

11. A mounting arrangement according to claim 1, wherein the mounting arrangement comprises a pair of said connecting means, arrangeable in spaced relationship to each other about the engine.

12. A mounting arrangement according to claim 11, wherein the connecting means are arranged opposite each other on the engine.

13. A mounting arrangement according to claim 1, wherein the mounting arrangement further comprises a securing member to further secure the engine to the vehicle, the securing member being provided rearwardly of the engine.

14. A mounting arrangement according to claim 1, wherein the mounting arrangement comprises carrying means to carry the housing, the carrying means comprising a pair of legs which are joined to each other and to the outer component at one end of each leg.

15. A mounting arrangement according to claim 13, wherein the opposite ends of the legs are attached to the engine in spaced relation to each other.

16. A mounting arrangement according to claim 13, wherein the carrying means is arrangeable on the engine at a region between the pair of said connection means, substantially midway therebetween.

17. A mounting arrangement according to claim 13, wherein two of said carrying means are arrangeable opposite each other on the engine.

18. A gas turbine engine comprising a core assembly and an outer component, and a mounting arrangement according to claim 1 for mounting the engine to a vehicle.

* * * * *